United States Patent [19]

Bible et al.

[11] Patent Number: 5,321,222
[45] Date of Patent: Jun. 14, 1994

[54] VARIABLE FREQUENCY MICROWAVE FURNACE SYSTEM

[75] Inventors: Don W. Bible, Clinton; Robert J. Lauf, Oak Ridge, both of Tenn.

[73] Assignee: Martin Marietta Energy Systems, Inc., Oak Ridge, Tenn.

[21] Appl. No.: 792,103

[22] Filed: Nov. 14, 1991

[51] Int. Cl.$^5$ .............................. H05B 6/64
[52] U.S. Cl. .................... 219/745; 219/761; 219/757; 363/17; 363/132; 315/39.3
[58] Field of Search ............... 219/10.55 B, 10.55 C, 219/10.55 D, 10.55 F, 10.75, 10.55 R; 363/17, 98, 132; 315/3.5, 39.3

[56] References Cited

U.S. PATENT DOCUMENTS

| | | | |
|---|---|---|---|
| 3,611,135 | 10/1971 | Margerum | 324/85 |
| 4,144,468 | 3/1979 | Mourier | 310/72 |
| 4,196,332 | 4/1980 | Mackay B et al. | 219/10.55 B |
| 4,340,796 | 7/1982 | Yamaguchi et al. | 219/10.55 B |
| 4,415,789 | 11/1983 | Nobue et al. | 219/10.55 B |
| 4,504,718 | 3/1985 | Okatsuka et al. | 219/10.55 B |
| 4,593,167 | 6/1986 | Nilssen | 219/10.55 B |
| 4,825,028 | 4/1989 | Smith | 219/10.55 B |
| 4,843,202 | 6/1989 | Smith et al. | 219/10.55 B |
| 4,866,344 | 9/1989 | Ross et al. | 315/3.5 |
| 4,939,331 | 7/1990 | Berggren et al. | 219/10.55 B |

Primary Examiner—Bruce A. Reynolds
Assistant Examiner—Tu Hoang
Attorney, Agent, or Firm—Martin J. Skinner; James M. Spicer; Harold W. Adams

[57] ABSTRACT

A variable frequency microwave furnace system (10) designed to allow modulation of the frequency of the microwaves introduced into a furnace cavity (34) for testing or other selected applications. The variable frequency microwave furnace system (10) includes a microwave signal generator (12) or microwave voltage-controlled oscillator (14) for generating a low-power microwave signal for input to the microwave furnace. A first amplifier (18) may be provided to amplify the magnitude of the signal output from the microwave signal generator (12) or the microwave voltage-controlled oscillator (14). A second amplifier (20) is provided for processing the signal output by the first amplifier (18). The second amplifier (20) outputs the microwave signal input to the furnace cavity (34). In the preferred embodiment, the second amplifier (20) is a traveling-wave tube (TWT). A power supply (22) is provided for operation of the second amplifier (20). A directional coupler (24) is provided for detecting the direction of a signal and further directing the signal depending on the detected direction. A first power meter (30) is provided for measuring the power delivered to the microwave furnace (32). A second power meter (26) detects the magnitude of reflected power. Reflected power is dissipated in the reflected power load (28).

20 Claims, 3 Drawing Sheets

VARIABLE FREQUENCY MICROWAVE FURNACE SYSTEM

This invention was made with Government support under Contract No. DE-AC05-84OR21400 awarded by the U.S. Department of Energy to Martin Marietta Energy Systems, Inc. and the Government has certain rights in this invention.

TECHNICAL FIELD

This invention relates to the field of microwave radiation. More specifically, this invention relates to a microwave furnace having the capability of selectively varying the frequency and power of the microwave source.

BACKGROUND ART

In the field of microwave radiation, it is well known that microwave furnaces are typically constructed with a fixed operating frequency. It has long been known that the interactions of various materials with microwaves are frequency dependent. These interactions may include curing rubber and sintering ceramics. It is therefore desirable to have a microwave furnace that can be operated over a broad frequency range.

Most microwave sources have a very narrow bandwidth because they employ a resonant cavity. Microwave ovens constructed for home use are provided with a magnetton which operates at 2.45 GigaHertz, which is an efficient frequency for heating water. Due to the coupling ability of a 2.45 GHz microwave to water, these ovens are used for cooking foods, drying, and other purposes wherein the principal material to be acted upon is water. However, it is well known that frequencies in this range are not suitable in all situations, such as with heating plasmas, sintering materials such as silica, and preparing films such as diamond films.

The use of frequency sweeping over a wide range as a means of mode stirring has important implications for the use of microwave power to sterilize medical equipment or contaminated wastes. In such uses it is crucial to eliminate "dead" areas in the cavity wherein sufficient power may not be received in order for complete sterilization. Electronic frequency sweeping may be performed at a high rate of speed such as to result in a much more uniform time-averaged power density throughout the furnace cavity. The desired frequency sweeping may be accomplished through the use of a traveling wave tube, or TWT. The TWT allows the sweeping to cover a broad bandwidth (2 to 8 GHz) compared to devices such as the voltage tunable magnetton (2.45 −0.05 GHz).

It is known that typical microwave sources such as the magnetton, klystron, and gyrotron tubes operate using resonant rf fields. The use of the resonant rf fields limits the available bandwidth of the microwave source.

Further, it is known that microwave ovens typically found in the home are known to have cold spots and hot spots. Such phenomena are attributed to the ratio of the wavelength to the size of the microwave cavity. With a relatively small frequency microwave introduced into a small cavity, standing waves occur and thus the microwave power does not uniformly fill all of the space within the cavity, and the unaffected regions are not heated. This type of oven cavity is typically referred to as a "single-mode" cavity.

Attempts have been made at mode stirring, or randomly deflecting the beam, in order to fill the cavity with the microwave radiation. One such attempt is the addition of rotating fan blades at the beam entrance of the cavity.

Another method used to overcome the adverse effects of standing waves is to intentionally create a standing wave within a single-mode cavity such that the workpiece may be placed at the location determined to have the highest power (the hot spot). Thus, only the portion of the cavity in which the standing wave is most concentrated will be used.

It has been shown that the sintering behavior of various materials improves at higher frequencies, although the exact reasons are not known. However, existing state of the art technology has made difficult the task of conducting a series of identical sintering experiments in which only the frequency is changed. This is due in large part to the fact that each microwave source is connected to a different furnace cavity. It is well known that the geometry of the furnace cavity is a parameter which must be considered in such experiments.

Furnaces incorporating gyrotron oscillators produce microwaves at 28 GigaHertz. The gyrotron furnaces are capable of sintering some materials more efficiently than those ovens provided with the 2.45 GHz magnetrons. The gyrotron furnaces have specific applications in sintering materials such as ceramics. However, 28 GHz is not an efficient frequency with which to sinter all materials. It is desired to determine the most efficient frequencies to apply to a given material in a furnace with a cavity having a selected configuration.

The frequency for most efficient processing may vary for a given material as the heating process occurs. As a material changes phases, a varied frequency may be required. Thus, it may be desired to have the capability of varying the frequency in the heating process, allowing the tester to begin heating the specimen at one frequency and then change the frequency to maintain good coupling as the temperature rises. This may also be desirable when heating composite materials, where the varying materials efficiently react at different frequencies.

Other devices have been produced to change the parameters of the heating process of selected materials. Typical of the art are those devices disclosed in U.S. Pat. No. 4,777,336 issued to J. Asmussen on Oct. 11, 1988, and 4,196,332 issued to A. MacKay B, et al., on Apr. 1, 1980 and further discussed in an article authored by the inventors "Frequency Agile Sources for Microwave Ovens", *Journal of Microwave Power*, 14(1), 1979. However, a microwave furnace having a wide frequency range has not been disclosed.

Therefore, it is an object of this invention to provide a microwave furnace that can be operated over a wide frequency range.

Another object of the present invention is to provide a microwave furnace which may be operated over a wide frequency range wherein the microwave source may be interchanged with microwave sources having other frequency ranges.

Still another object of the present invention is to provide a microwave furnace whereby two or more microwave sources may be placed into the system in parallel.

A further object of the present invention is to provide a microwave furnace including a plurality of microwave sources placed in parallel, wherein the microwave sources may be selectively and alternately used.

Still another object of the present invention is to provide such a microwave furnace with multiple microwave sources whereby each microwave source is controlled by a cannon signal generator and power supply.

Yet another object of the present invention is to provide a microwave furnace whereby frequency modulation may be used as a form of mode stirring to create a more uniform power distribution in a relatively small furnace cavity.

DISCLOSURE OF THE INVENTION

Other objects and advantages will be accomplished by the present invention which is designed to allow modulation of the frequency of the microwaves introduced into a furnace cavity for testing or other selected applications. Applicable processes include heat treatment, sterilization, sintering, plasma processing, ore processing, polymerization, etching, and preparing films.

A microwave signal generator means is provided for generating a low-power microwave signal for input to the microwave amplifier. The signal generator means of the preferred embodiment is able to sweep a given range of frequencies, operate in pulse mode, modulate the frequency of the microwave, and produce various complex waveforms. The microwave signal generator means of the preferred embodiment may be operated in the pulse mode using an internal pulse generator or it can be pulsed externally. An internal modulator is provided for wide band modulation. The internal modulator may operate in the AM mode or in the FM mode.

A voltage controller means serves to modulate the amplitude of the microwave voltage-controlled oscillator. The microwave voltage-controlled oscillator means may be used in lieu of the microwave signal generator means to modify the frequency and amplitude of the generated microwave.

A first amplification means may be provided to amplify the magnitude of the signal output from the microwave signal generator means or the microwave voltage-controlled oscillator means. The first amplification means of the preferred embodiment is voltage-controlled, therefore the gain is adjustable such that the magnitude of the output is selectable by the operator.

A second amplification means is provided for processing the signal output by the first amplification means, or from the microwave signal generator means or the microwave voltage-controlled oscillator means when a first amplification means is not employed. The second amplification means outputs a high-power microwave signal to the furnace cavity and to which the workpiece is subjected. In the preferred embodiment, the second amplification means is a traveling-wave tube (TWT). The TWT of the preferred embodiment includes an internal cooling means designed to dissipate the heat collected by the TWT during normal operation. Particularly, the helix of the TWT and the helix supports are fabricated from selected materials in order to perform this function.

A power supply is provided for the operation of the second amplification means. In the preferred embodiment, the power supply is a direct current source consisting of a precision-regulated helix power supply and a less-regulated collector high voltage supply.

A directional coupler is provided for detecting the direction of a signal and further directing the signal depending on the detected direction. A signal received from the TWT is directed toward the microwave furnace. A signal received from the direction of the microwave furnace is directed toward a reflected power load. The directional coupler thus provides a means whereby reflected power is diverted away from the TWT in order to protect the TWT from power unabsorbed by the workpiece. The directional coupler of the preferred embodiment is water-cooled for the dissipation of heat collected through the transmission of power from the TWT and the reflection of power from the microwave furnace.

A first power meter is provided for measuring the power delivered to the microwave furnace. The first power meter is used in conjunction with a second power meter positioned to measure reflected power from the microwave furnace in order to monitor the efficiency of the microwave furnace and to insure that reflected power is dissipated in the reflected power load and not by the second amplification means.

The reflected power load may also be used to test the functionality of the system by removing all workpieces from the furnace cavity, thus directing the entire signal from the second amplification means into the reflected power load. Comparisons can be made of the power received by the reflected power load and the power delivered from the second amplification means to determine any system losses.

The magnitude of the reflected power is detected by the second power meter. This magnitude may be used to determine the efficiency of the instant frequency of the microwave introduced into the microwave furnace cavity. A lower reflected power will indicate a more efficient operating frequency due to the higher absorption rate of the selected workpiece.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

A variable frequency microwave furnace system incorporating various features of the present invention is illustrated generally at 10 in the figures. The microwave furnace 10 is designed to allow modulation of the frequency of the microwaves introduced into a furnace cavity for testing or other selected applications. Such modulation is useful in testing procedures to determine the most efficient frequencies at which a particular material may be processed. Frequency modulation is also useful as a method of mode stirring as a means to create a more uniform power distribution in a relatively small furnace cavity.

Frequency modulation testing is useful, not only in the determination of efficient sintering frequencies of a selected material, but also in determining the most efficient sintering frequencies for the individual phases of a selected material. In the same vein, frequency modulation is useful in the processing of a material undergoing phase changes, wherein each phase of the material couples more efficiently to a frequency varied from that of other phases. Further, frequency modulation is useful when processing composite materials wherein each component couples to a different frequency than other components.

Figure 1:
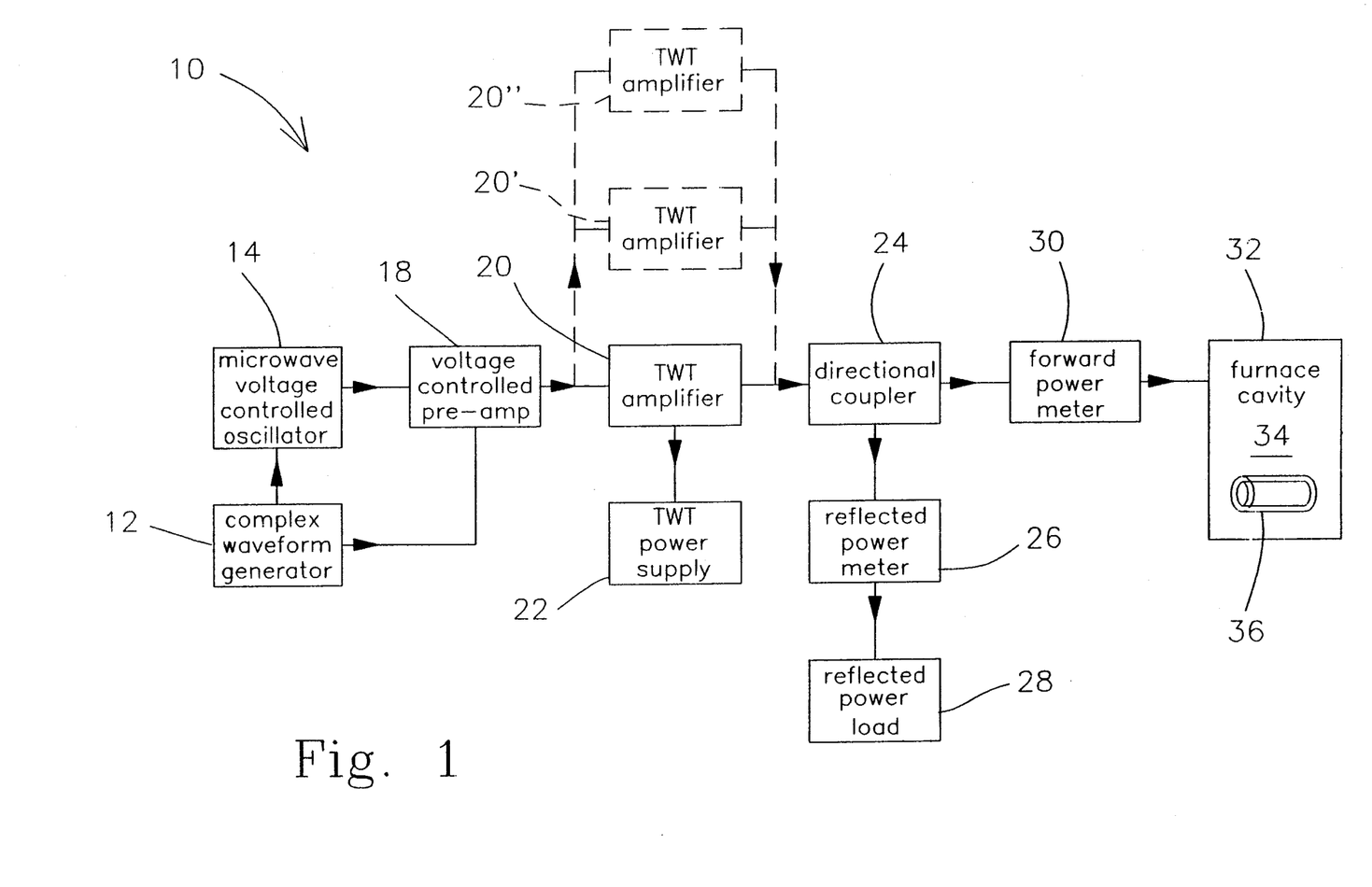
FIG. 1 is a schematic diagram of the preferred embodiment of the variable frequency microwave furnace system of the present invention.

FIG. 1 illustrates schematically the preferred embodiment of the variable frequency microwave furnace system of the present invention, wherein a selected workpiece 36 is to be processed. Applicable processes include heat treatment, sterilization, sintering, plasma processing, ore processing, polymerization, etching, and preparing films. It will be understood that the term "workpiece" as used within the present disclosure refers to a selected material or composition of materials. The term "workpiece" may further include such selected material or composition of materials wherein at least one of the materials is undergoing at least one phase change and is, therefore, in more than one phase at a given time.

A microwave voltage-controlled oscillator means 14 is provided for generating a low-power microwave signal for input to the microwave furnace 32. A complex waveform generator means 12 provides the controlling voltage to the voltage-controlled oscillator 14, causing the voltage-controlled oscillator to sweep a given range of frequencies, operate in pulse mode, modulate the frequency of the microwave, and produce various complex waveforms.

The complex waveform generator means 12 of the preferred embodiment may be operated in the pulse mode using an internal pulse generator or it can be pulsed externally. An internal modulator is provided for wide band modulation. The internal modulator may operate in the AM mode or in the FM mode.

The microwave voltage controlled oscillator means 14 generates a microwave signal of a frequency determined by the voltage applied to the voltage controlled oscillator means 14 by the waveform generator means 12. It may be desirable to modulate the frequency of the microwave as a selected material may efficiently couple with a particular frequency and require a high voltage level, whereas a second material may couple more efficiently at a different frequency and at a lower, or higher, voltage level. Thus, the microwave voltage-controlled oscillator 14 may be used in combination with the complex waveform generator means 12 to modify the frequency of the generated microwave.

It will be seen that the number of possible combinations of frequencies and power levels is numerous. Further, with the ability of such frequency and amplitude modulation, it will be seen that the processing of a workpiece 36 may be accomplished by alternating the frequency and amplitude of the microwave in order to achieve maximum processing efficiency. The modulations may occur at such rates as to be undetectable by the workpiece 36, yet creating maximum processing efficiency for each material and material phase.

A first amplification means be may be provided to amplify the power of the signal output from the microwave voltage-controlled oscillator 14. The first amplification means be of the preferred embodiment is voltage-controlled, therefore the gain is adjustable such that the magnitude of the output is selectable by the operator. During operation of the variable frequency microwave furnace system 10, the operator may instantaneously adjust the first amplification means be such that the amplitude of the microwave may be correspondingly adjusted. The control voltage for the first amplification means be can also be supplied by the complex waveform generator means 12, allowing the amplitude of the signal output to be modulated in any desired way.

A second amplification means 20 is provided for processing the signal output by the first amplification means 18, or from the microwave voltage-controlled oscillator means 14 when a first amplification means 18 is not employed. The second amplification means 20 outputs the microwave signal input to the multi-mode furnace cavity 34 and to which the workpiece 36 is subjected. In the preferred embodiment, the second amplification means 20 is a traveling-wave tube (TWT).

The TWT 20 is a linear beam device wherein a signal having a selected frequency and wave form is amplified and output. The TWT 20 has the capability of amplifying any selected frequency or waveform within a range or bandwidth defined by the configuration of the TWT 20. Particularly, the physical geometry of the TWT 20 limits the frequency range, such that as a high limit is reached, a counteracting signal is encountered, giving the appearance of a second wave.

In order to achieve a frequency higher or lower than that capable of the TWT 20 incorporated in a particular configuration, the internal geometry of the TWT 20, especially the pitch of the helix 40, is changed. In the latter mentioned TWT 20, a new frequency range 2O will be defined. It will be seen, therefore, that a variety of configurations of TWT's 20 is possible such that a broader range of frequencies may be achieved. To this end, the TWT's 20 of the present invention are designed to be selectively removable from the variable frequency microwave furnace system 10 and interchangeable with other such TWT's 20. Hence, a single microwave voltage-controlled oscillator means 14, microwave furnace 32, and microwave furnace cavity 34 may be used with a variety of TWT's 20, thus allowing a series of identical tests to be performed with the microwave frequency being substantially the only variable. One TWT 20 may define a frequency range of 4 GHz to 8 GHz, while another TWT 20' defines a frequency range of 8 GHz to 16 GHz. Still another TWT 20" may define a third frequency range. Interchanging TWT 20 with TWT 20' defines a total range from 4 GHz to 16 GHz. One such TWT 20 defining a range of 4 GHz to 8 GHz is the Model T-1096 G/H Band Helix TWT manufactured by Microwave Laboratories, Inc. Specifications for the Model T-1096 are listed in Table 1.

As earlier mentioned, the traveling wave tube 20 is a linear beam device characterized by a traveling electric field which continuously extracts energy longitudinally along the path of an electron beam. As shown graphically in FIG. 3 and diagrammatically in FIG. 4, a typical TWT 20 is constructed with an electron gun assembly 44 attached to the first end 46 of a single-wire helix 40. The gun assembly 44 produces a focused beam of electrons which is directed through the center of the helix 40. Tapered carbon attenuators 50, integral to the helix 40, serve as directional couplers preventing reflections from passing back to the tube input. Rf input and output windings 52, 54 are placed respectively at the cathode and collector ends 46, 48 of the helix 40.

TABLE 1

Specifications for the T-1096 G/H Band Helix TWT

|  | Min | Max | Typ | Unit |
|---|---|---|---|---|
| RF Performance |  |  |  |  |
| Power Output | 63.0 | 65.0 | 63.5 | dbm |
| Frequency Range | 4.0 | 8.0 |  | Ghz |
| Harmonic Content | — | −3.0 | −6.0 | dbc |
| Gain at rated Power | 25.0 | 37.0 | 30.0 | db |
| Electrical Parameters |  |  |  |  |
| Helix Voltage | −8.0 | −9.0 | −8.4 | kV |
| Anode Voltage (WRTC) | 0.0 | +9.0 | — | kV |
| Collector Voltage (WRTC) | +6.2 | +6.8 | +6.5 | kV |
| Filament Voltage (WRTC) | 12.4 | 13.2 | 12.8 | V |
| Solenoid Voltage | 35.0 | 57.0 | 48.0 | V |
| Vac-Ion Voltage | +3.5 | +5.0 | +3.5 | kV |
| Helix Current | — | 25.0 | 15.0 | mA |
| Anode Current | — | 5.0 | — | mA |
| Collector Current | 0.9 | 1.8 | 1.2 | A |
| Filament Current | 1.2 | 2.0 | 1.4 | A |
| Solenoid Current | 21.0 | 26.0 | 25.0 | A |
| Vac-Ion Current | — | 0.01 | — | mA |
| Prime Power |  | 10.7 | 9.2 | kW |

Figure 3:
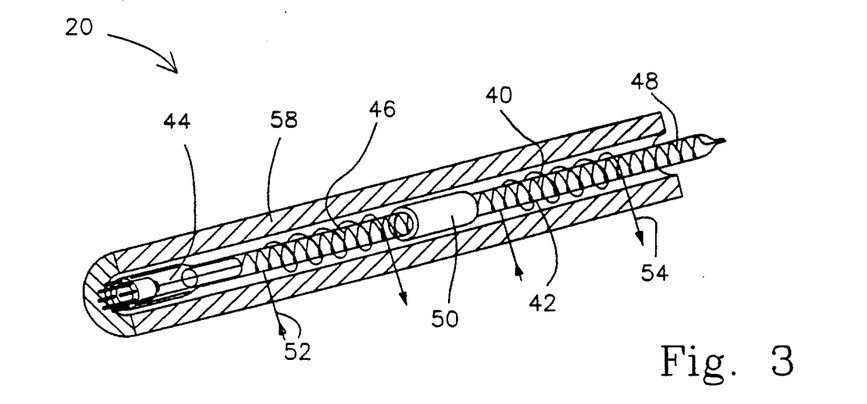
FIG. 3 is a perspective view of the traveling wave tube, shown partially in section, which is incorporated in the variable frequency microwave furnace system of the present invention.
Figure 4:
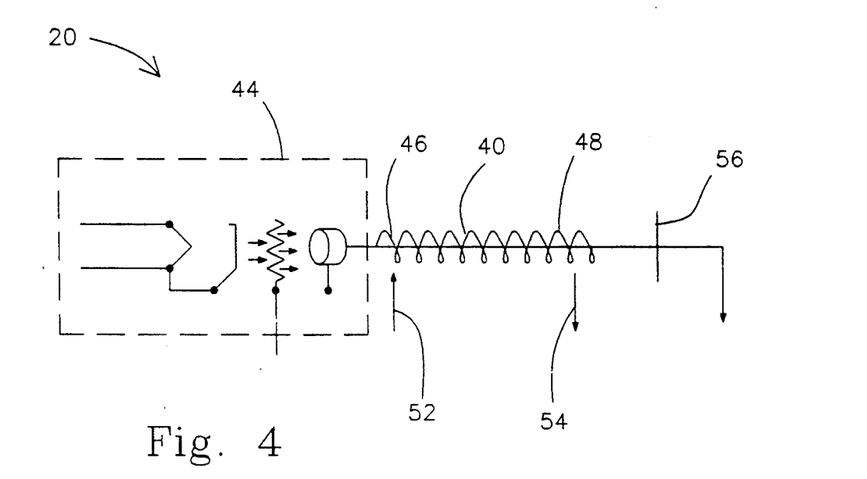
FIG. 4 is a schematic diagram of a traveling wave tube which is incorporated in the variable frequency microwave furnace system of the present invention.

A collector 56, charged positively, is located at the second end 48 of the helix 40. The collector 56 provides the source of energy for the operation of the TWT 20. Beam focusing and containment magnets 58 surround the entire assembly of the TWT 20.

Electrons traversing the axis of the helix 40 interact with the rf wave propagating along the helix 40 such that energy is transferred from the electron beam to the rf wave. This interaction is continuous and cumulative, increasing the amplitude of the rf signal as it propagates along the helix 40.

Figure 5:
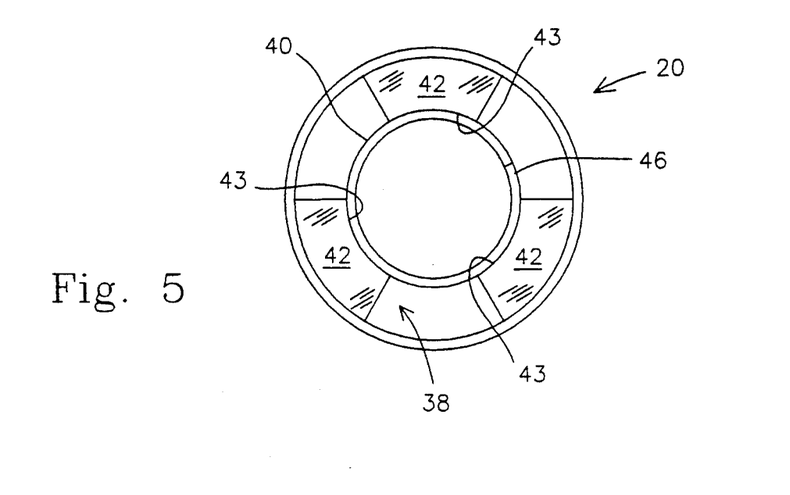
FIG. 5 is an end view of the traveling wave tube, shown in cross-section, which is incorporated in the variable frequency microwave furnace system of the present invention.

The TWT 20 of the preferred embodiment includes an internal cooling means 38 designed to dissipate the heat collected by the TWT 20 during normal operation. Particularly, the helix of the TWT 20 and the helix supports 42 are fabricated from selected materials in order to perform this function. The TWT 20 of the preferred embodiment is provided with a helix 40 fabricated from flat copper wire. A plurality of retainers 42 are positioned in parallel fashion about the longitudinal axis of the TWT 20 about which the copper wire is wrapped, the retainers 42 serving to retain the helix 40 defined by the copper wire and further to dissipate the heat transferred to the copper wire during operation of the TWT 20. In the preferred embodiment the retainers 42 define a cross section with at least one substantially flat side 43, the flat side 43 being in substantial contact with the copper wire.

Further, the retainers 42 of the preferred embodiment are fabricated from beryllium oxide. It is known that even though beryllium oxide is an electrical insulator, it is also an excellent conductor of heat. The copper wire defining a flat cross section and substantially contacting the flat side 43 of the retainers 42 provides for an efficient and thorough dissipation of the heat transferred to the copper wire, thus providing a cooling means 38 for the internal portion of the TWT 20 and hence extending the life of the TWT 20.

Figure 2:
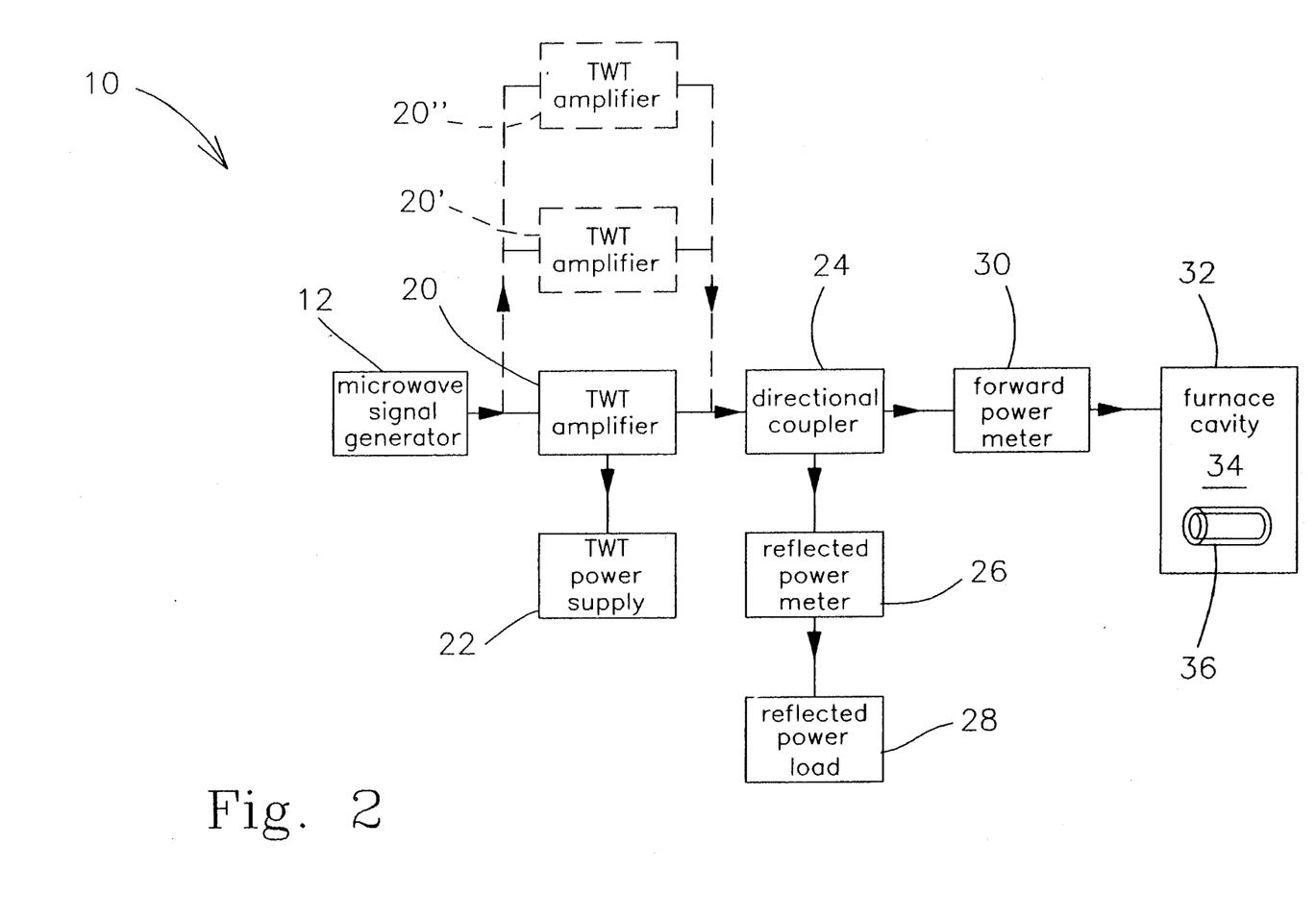
FIG. 2 illustrates a schematic diagram of another preferred embodiment of the variable frequency microwave furnace system of the present invention.

A power supply 22 is provided for the operation of the second amplification means 20. Though not individually depicted in the figures, the preferred power supply 22 is a direct current source consisting of a precision-regulated helix power supply and a less-regulated collector high voltage supply. Output regulation for the helix supply is accomplished through a tube regulator circuit using a tetrode tube. One such tube is the Eimac 4PR400A tube. Regulation for the collector supply and the helix raw supply is accomplished with an electromechanical regulator. The collector supply of the preferred embodiment is provided with two switch plates for the selection of output ranges. A typical power supply 22 used to power the second amplification means 20 is the Universal Volttonics Model BRE-15-140-ML High Voltage Power Supply. The specifications of the Universal Voltronics power supply are listed in Table 2.

TABLE 2

Electrical Specifications for the Universal Voltronics Model BRE-15-140-ML Power Supply

| HELIX SUPPLY |  |
|---|---|
| Output Voltage | 500 V–15 KVDC |
| Output Current | 140 mADC |
| Polarity | Negative Output |
| Ripple | .01% rms @ 15 KVDC, 140 mADC |
| Regulation, load | +0.1% from no load to full load @ maximum output |
| Regulation, line | +0.1% for line voltage from 190–230 VAC @ maximum |
| COLLECTOR SUPPLY |  |
| Output Voltage and Current |  |
| Mode I (parallel) | 0–5 KV @ 4000 mA |
| Mode II (series) | 0–10 KV @ 2000 mA |
| Polarity | Positive output, negative tied to helix supply |
| Ripple | 3% rms @ 10 KVDC, 2000 mA |
| Regulation, load | +2% from no load to full load @ maximum output |
| Regulation, line | +2% for line voltage from 190–230 VAC @ maximum |
| ouput |  |
| CROWBAR (connected across the collector supply) |  |
| Response Time | 5 microseconds |
| SYSTEM |  |
| Input Voltage | 190–230 VAC phase to phase, 3 phase, 60 Hz, 30 KVA |
| Power Connection | 5 position terminal board (3 phase neutral ground) |
| Output Connectors | 10–32 studs for collector, cathode & helix |
| Controls Connector | 90 pin Elco connector |

As shown in FIG. 2, the variable frequency microwave furnace system 10 may be operated without the use of a microwave voltage-controlled oscillator means 14 and a fist amplification means 18. In this embodiment, the microwave signal generator means 12 is employed independently to generate a selected signal and is output directly without further modification. One such microwave signal generator means 12 is the Model 6724 signal generator manufactured by Wiltton. In this embodiment, the amplitude modulation is performed within the power supply 22 of the TWT 20.

Referring to FIGS. 1 and 2, a directional coupler 24 is provided for detecting the direction of a signal and further directing the signal depending on the detected direction. The directional coupler 24 is provided proximate the collector end of the second amplification means 20. A signal received from the TWT 20 is directed toward the microwave furnace 32. A signal received from the direction of the microwave furnace 32 is directed toward a reflected power load 28. The directional coupler 24 thus provides a means whereby a reflected signal—that is, power not absorbed by the workpiece 36 and therefore directed back toward the source 20—is diverted away from the TWT 20 in order to protect the TWT 20 from power unabsorbed by the workpiece 36. The reflected power load 28 of the preferred embodiment is water-cooled for the dissipation of heat collected through the reflection of power from the microwave furnace.

A first power meter 30 is provided for measuring the power delivered to the microwave furnace 32. The first power meter 30 is used in conjunction with a second power meter 26 positioned to measure reflected power from the microwave furnace 32 in order to monitor the efficiency of the microwave furnace and to insure that reflected power is dissipated in the reflected power load 28 and not by the second amplification means 20.

The signal output by the second amplification means 20 is introduced into the microwave furnace cavity 34 for absorption by the selected workpiece 36. Typically, the introduced signal is not completely absorbed by the workpiece 36 and is therefore reflected back toward the second amplification means 20, having no other path to follow.

The reflected signal reaches the directional coupler 24 and is there diverted toward the second power meter 26 and finally to the reflected power load 28. The reflected power is dissipated in the reflected power load 28, as previously mentioned, in an attempt to protect the longevity of the second amplification means 20. The reflected power load 28 may also be used to test the functionality of the system by removing all workpieces 38 from the furnace cavity 34, thus directing the entire load from the second amplification means 20 into the reflected power load 28. Comparisons can be made of the power received by the reflected power load 28 and the power delivered from the second amplification means 20 to determine any system losses.

The magnitude of the reflected power detected by the second power meter 26. This magnitude may be used to determine the efficiency of the instant frequency of the microwave introduced into the microwave furnace cavity 34. A lower reflected power will indicate a more efficient operating frequency due to the higher absorption rate of the selected workpiece 36.

From the foregoing description, it will be recognized by those skilled in the art that a variable frequency microwave furnace system offering advantages over the prior art has been provided. Specifically, the microwave furnace of the present invention provides a means for adjusting the frequency of the microwaves introduced into a cavity for sintering purposes, or as otherwise required. It will be seen that the microwave furnace of the present invention is useful in testing the processing characteristics of selected materials with respect to microwave frequency. Such test will enable the design of a microwave furnace with a microwave source which generates microwaves at the determined frequency.

It will further be seen that the microwave furnace of the present invention is useful as a production tool in that the frequency of the microwaves may be varied for different materials or material phases. The frequency modulation may be performed during the operation of the microwave furnace in order to accommodate various materials and material phases. Further, the frequency modulation capability of the present invention serves as a method of mode stirring for creating a more uniform power distribution in relatively small furnace cavities.

The efficiency of the variable frequency microwave system of the present invention has been displayed in various tests performed in the development process. Described below are two embodiments tested, however, it is not the intentions of the inventors to limit the present invention to such embodiments.

In the first tested embodiment, a 2.5 KW microwave furnace suitable for sintering, heat treatment, and other high-temperature processes was constructed. A voltage-controlled oscillator, Model VC0 100-0243 manufactured by Delphi Components, provided a low-power microwave signal, continuously variable from 4 to 8 GHz by the application of a 0 to 15 V control signal. A solid state preamplifier with a variable gain option, Model NHI 4080MW-2 manufactured by National Hybrid, Inc., provided variable amplification of the signal from the voltage-controlled oscilattor.

A high-power microwave amplifier included a traveling wave tube, Model T-1096 manufactured by Microwave Laboratories, Inc. (see Table 1), and a high-voltage DC power supply, Model BRE-15-140-ML manufactured by Universal Volttonics (see Table 2). The high-power microwave amplifier amplified the signal for a gain of approximately +37 db. The resulting microwave power was continuously selectable over a frequency range of 4 to 8 GHz and a power range of 0 to 2.5 KW. The frequency and amplitude could be individually modulated into any waveform within these parameters.

A dual directional coupler, Model R202-5N manufactured by Microwave Engineering Corporation, was provided, through which the microwave power is applied. The microwave power was input to a multimode cavity approximately 12 inches in diameter and approximately 9 inches long such that a wide variety of random microwave modes were excited within the cavity. Forward and reflected power levels were continuously measured with two power meters, Model HP436A manufactured by Hewlett Packard.

Efficient microwave heating was demonstrated for both silicon carbide and boron carbide ceramic bodies. In each case the frequency could be adjusted to minimize reflected power for the actual load in the cavity, and the ceramic heated rapidly. There was no need to adjust the dimensions of the cavity or to excite any particular mode in order to heat with maximum efficiency.

In the second tested embodiment, a 300 W microwave furnace suitable at least for plasma processing, sterilization and food processing studies was constructed using the multimode cavity from a conventional microwave oven and an air-cooled traveling wave tube with a bandwidth of 2 to 8 GHz.

Experiments with a wide variety of samples including water, popcorn, and alumina ceramics doped with Co, Cr, or V oxides demonstrated highly efficient heating when the microwave frequency was adjusted to minimize reflected power. Results showed that when the frequency was continuously swept across the operating bandwidth, reflected power was extremely low and the sample heated efficiently regardless of its location within the cavity.

While two preferred embodiments have been shown and described, and two embodiments which have been constructed and tested have been specifically delineated, it will be understood that such descriptions are not intended to limit the disclosure, but rather it is intended to cover all modifications and alternate methods falling within the spirit and the scope of the invention as defined in the appended claims or their equivalents.

Having thus described the aforementioned invention,

1. A variable frequency microwave furnace system for processing selected materials, said variable frequency microwave furnace system including a microwave furnace which defines a multimode cavity for processing said selected materials, and said variable frequency microwave furnace system comprising:

a microwave signal generator for generating a signal with a selected waveform, frequency, and amplitude;

a first signal amplifier for amplifying said signal generated by said signal generator, said first signal amplifier producing microwaves within a selected frequency range, said microwaves having an associated power with a selected magnitude, said first signal amplifier comprising a traveling wave tube;

a power supply for supplying power to said first signal amplifier; and a transmitter for conveying said microwaves produced by said first signal amplifier into said microwave furnace.

2. The variable frequency microwave furnace system of claim 1 wherein said traveling wave tube defines a useful bandwidth within a range of at least ten percent above and below a center frequency of said traveling wave tube.

3. The variable frequency microwave furnace system of claim 1 wherein said traveling wave tube is a helical traveling wave tube.

4. The variable frequency microwave furnace system of claim 1 wherein said power supply is adjustable thereby said amplitude of said signal generated by said signal generator is selectively modulated.

5. The variable frequency microwave furnace system of claim 1 further comprising a signal amplitude controller for selectively modulating said amplitude of said signal generated by said signal generator.

6. The variable frequency microwave furnace system of claim 1 further comprising a second amplifier for selectively amplifying said signal generated by said signal generator prior to amplification by said first amplifier.

7. The variable frequency microwave furnace system of claim 1 further comprising:

a signal director for directing said microwaves produced by said first amplifier and microwaves reflected from said microwave furnace; and a reflected load dissipator for dissipating said microwaves reflected from said microwave furnace, said microwaves reflected from said microwave furnace having an associated power and magnitude thereof.

8. The variable frequency microwave furnace system of claim 7 wherein said signal director is provided with a cooling device for dissipating heat accumulated through operation of said signal director.

9. The variable frequency microwave furnace system of claim 7 further comprising a system monitor for monitor said magnitude of said power associated with said microwaves conveyed to said microwave furnace and said magnitude of said power associated with said microwaves reflected from said microwave furnace, said system monitor serving to monitor an efficiency of said variable frequency microwave furnace system.

10. A variable frequency microwave furnace system for processing selected materials, said variable frequency microwave furnace system including a microwave furnace which defines a multimode cavity for processing said selected materials, and said variable frequency microwave furnace system comprising:

a microwave signal generator for generating a signal with a selected waveform, frequency, and amplitude;

a first signal amplifier for amplifying said signal generated by said signal generator, said first signal amplifier producing microwaves within a selected frequency range, said microwaves having an associated power with a selected magnitude, said first signal amplifier comprising a traveling wave tube;

a power supply for supplying power to said first signal amplifier, said power supply being adjustable thereby said amplitude of said signal generated by said signal generator is selectively modulated;

a signal director for directing said microwaves produced by said first amplifier and microwaves reflected from said microwave furnace;

a reflected load dissipator for dissipating said microwaves reflected from said microwave furnace, said microwaves reflected from said microwave furnace having an associated power and magnitude thereof; and a transmitter for conveying said microwaves produced by said first signal amplifier into said microwave furnace.

11. The variable frequency microwave furnace system of claim 10 wherein said traveling wave tube defines a useful bandwidth within a range of at least ten percent above and below a center frequency of said traveling wave tube.

12. The variable frequency microwave furnace system of claim 10 wherein said traveling wave tube is a helical traveling wave tube.

13. The variable frequency microwave furnace system of claim 10 further comprising a signal amplitude controller for selectively modulating said amplitude of said signal generated by said signal generator.

14. The variable frequency microwave furnace system of claim 10 further comprising a second amplifier for selectively amplifying said signal generated by said signal generator prior to amplification by said first amplifier.

15. The variable frequency microwave furnace system of claim 10 wherein said signal director is provided with a cooling device for dissipating heat accumulated through operation of said signal director.

16. The variable frequency microwave furnace system of claim 10 further comprising a system monitor for monitoring said magnitude of said power associated with said microwaves conveyed to said microwave furnace and said magnitude of said power associated with said microwaves reflected form said microwave furnace, said system monitor serving to monitor an efficiency of said variable frequency microwave furnace system.

17. A variable frequency microwave furnace system for processing selected materials, said variable frequency microwave furnace system including a microwave furnace which defines a multimode cavity for processing said selected materials, and said variable frequency microwave furnace system comprising:

a microwave signal generator for generating a signal with a selected waveform, frequency, and amplitude;

a signal amplitude controller for selectively modulating said amplitude of said signal generated by said signal generator;

a first amplifier for selectively amplifying said signal generated by said signal generator;

a second signal amplifier for amplifying said signal generated by said signal generator and amplified by said first signal amplifier, said second signal amplifier producing microwaves within a selected frequency range said microwaves having an associated power with a selected magnitude, said second signal amplifier comprising a traveling wave tube;

a power supply for supplying power to said second signal amplifier, said power supply being adjustable thereby said amplitude of said signal generated by said signal generator is selectively modulated;

a transmitter for conveying said microwaves produced by said second signal amplifier into said microwave furnace;

a signal director for directing said microwaves produced by said second amplifier and microwaves reflected from said microwave furnace;

a reflected load dissipator for dissipating said microwaves reflected from said microwave furnace, said microwaves reflected from said microwave furnace having an associated power and magnitude thereof; and a system monitor for monitoring said magnitude of said power associated with said microwaves conveyed to said microwave furnace and said magnitude of said power associated with said microwaves reflected from said microwave furnace, said system monitor serving to monitor an efficiency of said variable frequency microwave furnace system.

18. The variable frequency microwave furnace system of claim 17 wherein said traveling wave tube defines a useful bandwidth within a range of at least ten percent above and below a center frequency of said traveling wave tube.

19. The variable frequency microwave furnace system of claim 17 wherein said traveling wave tube is a helical traveling wave tube.

20. The variable frequency microwave furnace system of claim 17 wherein said signal director is provided with a cooling device for dissipating heat accumulated through operation of said signal director.

* * * * *